US009289732B2

United States Patent
Helbing et al.

(10) Patent No.: US 9,289,732 B2
(45) Date of Patent: Mar. 22, 2016

(54) DYNAMIC MIXER

(71) Applicant: Oerlikon Textile GmbH & Co. KG, Remscheid (DE)

(72) Inventors: Ulrich Helbing, Burscheid (DE); Dietrich Witzler, Rommerskirchen (DE); Heike Jungbluth, Rommerskirchen (DE)

(73) Assignee: OERLIKON TEXTILE GMBH & CO. KG, Remscheid (DE)

( * ) Notice: Subject to any disclaimer, the term of this patent is extended or adjusted under 35 U.S.C. 154(b) by 324 days.

(21) Appl. No.: 13/909,536

(22) Filed: Jun. 4, 2013

(65) Prior Publication Data

US 2013/0272088 A1 Oct. 17, 2013

Related U.S. Application Data

(63) Continuation-in-part of application No. PCT/EP2011/072270, filed on Dec. 9, 2011.

(30) Foreign Application Priority Data

Dec. 22, 2010 (DE) .......................... 10 2010 055 860
Feb. 8, 2011 (DE) .......................... 10 2011 010 517

(51) Int. Cl.
*B01F 7/00* (2006.01)
*B01F 15/00* (2006.01)
*B29B 7/40* (2006.01)

(52) U.S. Cl.
CPC ......... *B01F 7/00208* (2013.01); *B01F 7/00816* (2013.01); *B01F 15/00694* (2013.01); *B01F 15/00831* (2013.01); *B01F 15/00935* (2013.01); *B29B 7/401* (2013.01); *B29B 7/407* (2013.01); *B01F 2015/0011* (2013.01); *B01F 2015/00103* (2013.01); *B01F 2015/00116* (2013.01)

(58) Field of Classification Search
CPC .................................................. B01F 7/00208
USPC .................................................... 366/78, 289
See application file for complete search history.

(56) References Cited

U.S. PATENT DOCUMENTS 2,020,878 A * 11/1935 Doering .......................... 366/78
2,977,098 A    3/1961 Watson et al.
3,063,726 A   11/1962 Dunnous

OTHER PUBLICATIONS

PCT/EP2011/072270 International Preliminary Report on Patentability dated Jun. 25, 2013 (6 pages).

(Continued)

*Primary Examiner* — David Sorkin
(74) *Attorney, Agent, or Firm* — Brinks Gilson & Lione; G. Peter Nichols

(57) ABSTRACT

A dynamic mixer for mixing flowable media, which has a mixing chamber in a multipart housing is described. A plurality of inlets and an outlet of the mixing chamber are arranged on the housing, and a mixing shaft having a mixer section projects into the mixing chamber. The mixing shaft is mounted in a sliding bearing in the housing by means of a bearing section and passes through the housing with a drive section for coupling to a drive. To avoid dead spaces within the housing, the housing has a sealing hole for accommodating the drive section of the mixing shaft and a bearing hole for mounting the bearing section of the mixing shaft, where the sealing hole has a greater diameter than the bearing hole in order to accommodate a sealing means.

10 Claims, 3 Drawing Sheets

(56) References Cited

OTHER PUBLICATIONS

Article, F. Dickmeis, "*High-Efficiency Dynamic Cavity Mixers for Polymer Processing*", Chemical Fibers International, IBP Press, vol. 57, No. 1/02, Mar. 1, 2007, pp. 45-48, XP001541083, ISSN: 0340-3343.

PCT/EP2011/072270 International Search Report dated Mar. 30, 2012 (6 pages including 3 page English translation).

* cited by examiner

DYNAMIC MIXER

This application is a continuation-in-part of and claims the benefit of priority from PCT application PCT/EP2011/072270 filed Dec. 9, 2011; German Patent Application DE 10 2010 055 860.5 filed Dec. 22, 2010; and German Patent Application DE 10 2011 010 517.4 filed Feb. 8, 2011, the disclosure of each is hereby incorporated by reference in its entirety.

BACKGROUND

The invention concerns a dynamic mixer for mixing flowable media.

With polymer processing, it is known that the properties of the polymers can be broadly affected by means of supplements. For this, it is normal to mix the supplements with the polymer. As supplements, additives, dyes, stabilizers, lubricants or other polymers can be mixed into the base polymer. It is also possible, however, to mix various supplementary agents, such as dyes, with one another prior to adding them to the polymer. For this, it is normal to use dynamic mixers, by means of which the media are mixed inside of a mixing chamber by means of a mixing shaft.

Mixers of this type are described, for example, in the trade article "High-Efficiency-Dynamic Cavity Mixers for Polymer Processing," F. Dickmeis, Chemical Fibre International, Vol. 57, 2007, Page 45 ff. There, a mechanical mixer is described as consisting of a multipart housing, in which a mixing chamber having a mixing shaft is disposed. The mixing shaft includes a mixing section extending into the mixing chamber, a bearing section, and a drive section extending out of the housing for coupling to a drive. The bearing section of the mixing shaft is disposed in the housing in a manner to accommodate a radial bearing such as a sliding bearing.

With dynamic mixers of this type there are a number of more or less distinct dead spaces in the transitional region between the bearing section and the drive section of the mixing shaft in the housing, in which build-up of the media that is to be mixed collect. Build-up of this type can be used advantageously for lubricating the bearing section of the mixing shaft, but have, however, the disadvantage that, for example, following a color change, undesired impurities remain inside the mixing chamber.

It is therefore an objective of the invention to provide a dynamic mixer for mixing flowable media, in which the housing is designed without any substantial dead spaces on the circumference of the mixing shaft having a direct connection to the mixing chamber.

This objective may be obtained in accordance with the invention by providing a housing that includes a sealing hole for accommodating the drive section of the mixing shaft, and a bearing hole for supporting the bearing section of the mixing shaft and, for accommodating a sealing means, such that the sealing hole has a greater diameter than the bearing hole.

Advantageous embodiments of the invention are defined by the characteristics and combinations of characteristics described below.

The invention has a particular advantage that there is a minimum of transitional zones in the housing between the bearing section of the mixing shaft and the drive section of the mixing shaft. Thus, the bearing hole for supporting the mixing shaft and the sealing hole for sealing the mixing shaft can be designed to be directly adjacent to one another within the housing, wherein an accommodation of the sealing means as far as the bearing hole is possible as a result of the larger sealing hole.

In a particularly advantageous embodiment of the invention and in order to improve the ease of assembly of the individual components, and at the same time, in order to minimize the transition zones between the bearing hole and the sealing hole, an interstice is incorporated in the housing between the bearing hole and the sealing hole.

According to an advantageous embodiment of the invention, the bearing hole is formed in a separate bearing housing, and the sealing hole is formed in a separate sealing housing, wherein the housing parts are connected to one another by means of an interstice, such that they are pressure-sealed. In this manner, the design and production of the housing parts as well as the holes, adapted to the respective function thereof, is possible.

It has been found that in mixing abrasive media, direct interaction between the sealing means and the medium, which is introduced into the bearing hole for a sliding bearing of the mixing shaft, is to be prevented as much as possible in order to avoid the occurrence of increased wear to the sealing means. In this respect, the invention is preferably implemented in which a supporting ring is associated with the sealing means on the circumference of the mixing shaft, by means of which the sealing means is braced against the bearing hole. And as a result movement of the sealing means is substantially prevented so that the sealing means does not end up in a bearing gap between the housing and the mixing shaft as a result of gap extrusion.

The sealing means is preferably designed as a packing gland, which is associated with a pressure spring. The pressure spring can be attached to the housing by means of a screw adapter, for example, in such a manner that the packing gland is tensioned by means of the pressure spring, thus holding it against the support ring. By this means, on one hand, a uniform friction effect on the circumference of the mixing shaft can be generated, and on the other hand, a high degree of sealing is obtained.

In order to ensure that the mixing shaft can rotate with the greatest degree of uniform frictional behavior within the bearing hole, one embodiment of the invention provides a lubricant hole opening into the bearing hole and connected to one of the inlets associated with the bearing hole. By this means it is possible to feed a medium supplied to the mixer directly to the bearing hole, and thereby the sliding bearing. By means of the pressure difference acting on the mixing chamber it is therefore possible to generate a constant lubricant flow toward the mixing chamber.

Depending on the design of the mixing shaft in the region of the mixing section, it may be desirable if the mixing shaft is guided in the mixing chamber without any substantial axial motion. For this, one embodiment of the invention includes an axial bearing outside of the sealing hole and associated with the drive section of the mixing shaft, which is retained by means of an adapter housing connected to the sealing housing. By this means both internal and external axial forces to the mixing shaft can be accommodated. In addition, by this means motion of the mixing shaft, generated by means of gravity, is also prevented in a vertical assembly.

For this it has been shown that an additional seal with respect to the axial bearing is advantageous for preventing any leaks occurring via the mixing shaft leading outward. Thus, it is provided that on the circumference of the drive section of the mixing shaft, between the axial bearing and the sealing means, a shaft seal and an annular chamber are formed, wherein the annular chamber can be filled with a sealing medium. By this means a full sealing against the exterior is created.

For intensive mixing of the media within the mixing chamber, a groove system is preferably implemented, wherein circumferential grooves on the circumference of the mixing shaft and the housing grooves normally interact. For the design of housing grooves of this sort, one embodiment of the invention includes a mixing chamber formed by means of numerous housing rings, which are retained in the housing in a pressure-sealed manner, and which, together with the mixing section in the mixing shaft, form a groove system within the mixing chamber.

The housing rings are preferably disposed between an outlet housing and the bearing housing, wherein the mixing chamber extends from the bearing housing to the outlet housing.

The inlets for the supplying of the media are preferably formed directly on the bearing housing, such that the outlet is integrated at the end of the mixing chamber at the outlet housing.

The dynamic mixer according to the invention is preferably used for the processing of polymers. There is also the possibility that a polymer and a supplementary substance, or only supplementary substances, such as liquid dyes, for example, are mixed.

BRIEF DESCRIPTION OF THE DRAWINGS

The dynamic mixer according to the invention shall be explained in greater detail in the following based on a few embodiments, with reference to the attached figures.

DETAILED DESCRIPTION

Figure 1:
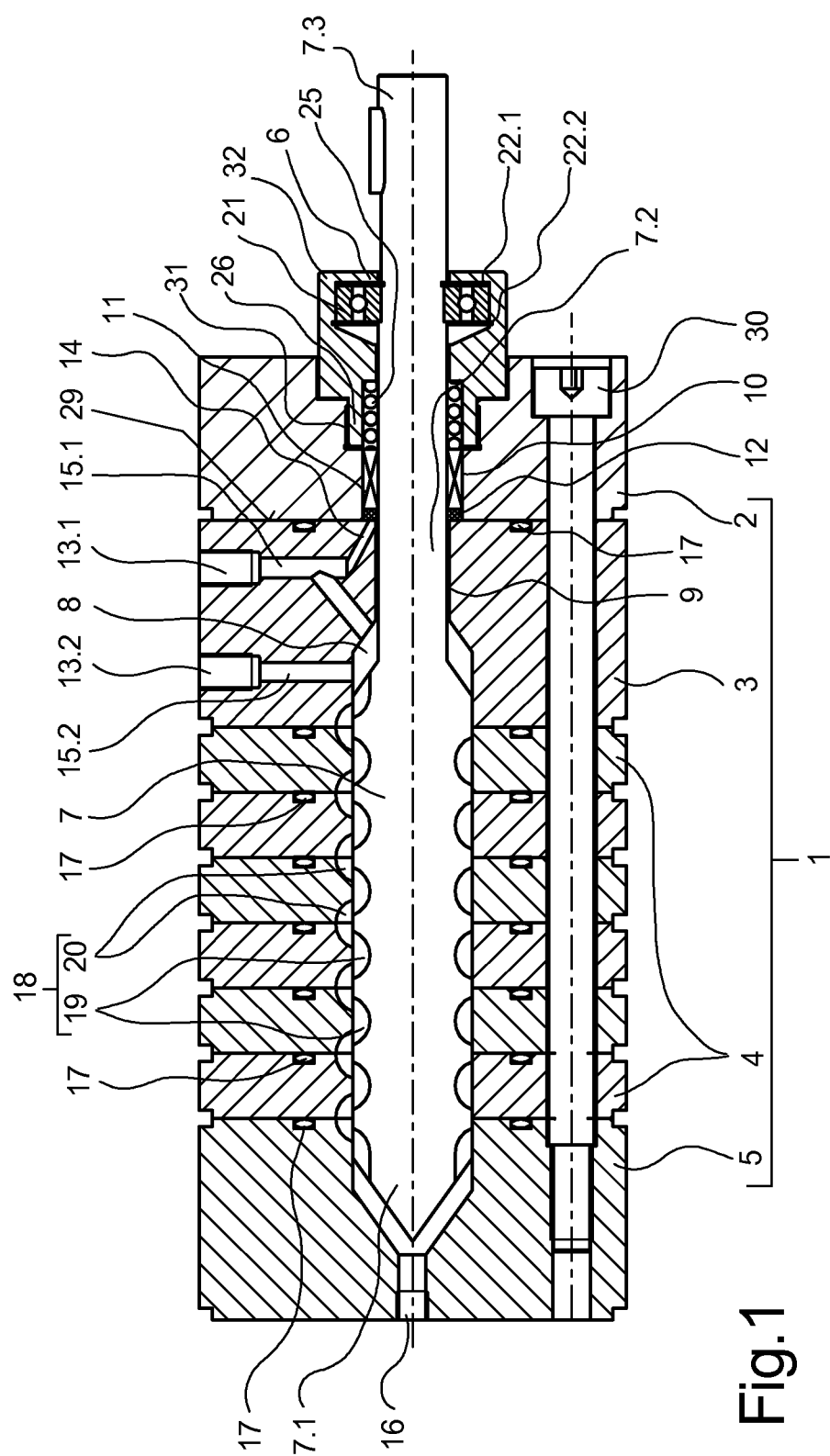
FIG. 1 shows schematically a cross-section view of a first embodiment of the mixer according to the invention.

In FIG. 1. a first embodiment of a dynamic mixer for mixing flowable media is depicted schematically in a cross-section view. The mixer includes a multipart housing 1, comprising an inner mixing chamber 8 and a mixing shaft 7. The housing 1 is cylindrical in shape, and is comprised of a sealing housing 2, a bearing housing 3, numerous housing rings 4 and an outlet housing 5. The housing parts 2, 3, 4, 5 are connected to one another in a pressure-sealed manner by means of numerous screws 30. For this purpose, numerous sealing rings 17 are disposed between the housing parts.

The mixing chamber 8 extends between the bearing housing 3 and the outlet housing 5, wherein the housing rings 4 form the actual mixing space in the mixing chamber 8. By this means, an inlet end of the mixing chamber 8 is formed within the bearing housing 3. An outlet end of the mixing chamber 8 is formed by means of the outlet housing 5. An outlet 16 is disposed on the outlet housing 5 at the outermost end surface, which opens directly into the mixing chamber 8.

Numerous inlets 13.1 and 13.2 are associated with the inlet end of the mixing chamber 8 at the bearing housing 3, which are each connected to the mixing chamber 8 via an inlet channel 15.1 and 15.2.

A mixing shaft is rotatably retained within the mixing chamber 8, which extends inward with a mixing section 7.1 into the mixing chamber 8. The mixing section 7.1 is followed by a bearing section 7.2 and a drive section 7.3, such that the mixing shaft 7 passes through the bearing housing 3 and the sealing housing 2, in order that it may be coupled to a drive, such as an electric motor, at its free end of the drive section 7.3.

The mixing section 7.1 of the mixing shaft 7 is adapted in terms of its diameter to the mixing chamber 8, wherein the mixing section 7.1 of the mixing shaft 7 includes numerous mixing grooves 19 on its circumference, which form a groove system 18 together with numerous housing grooves 20 formed in the housing rings 4. The housing grooves 20 are formed for this purpose in sections on the inner circumference of the housing rings 4. The mixing grooves 19 on the circumference of the mixing section 7 are formed such that they are distributed over the entire circumference of the mixing shaft, and are oriented along the radial axis thereof. In the embodiment depicted in FIG. 1, the groove system 18 in the mixing chamber 8 is formed by a total of six housing rings 4. The number of housing rings 4, as well as the length of the mixing section 7.1 of the mixing shaft 7 are arbitrary, and only depicted here by way of example.

On the inlet end of the mixing chamber 8, the bearing housing 3 includes a bearing hole 9, designed to be concentric to the mixing chamber 8. The bearing hole 9 extends as far as an interstice 29, formed between the bearing housing 3 and the sealing housing 2. The bearing section 7.2 of the mixing shaft 7 is supported within the bearing housing 3 by a sliding bearing. A lubricant channel 14 is formed at the end of the bearing hole 7.2 in the region of the interstice 29, which connects the bearing hole 9 with the inlet 13.1. A medium running through the inlet 13.1 is supplied via the lubricant channel 14 to the bearing hole 9, and thus to the sliding bearing for the mixing shaft 7.

The sealing housing 2 is joined directly to the bearing housing 3 at the interstice 29. The sealing housing 2 includes a sealing hole 10, which is formed such that it is concentric to the bearing hole 9, and separated from the bearing hole 9 by means of the interstice 29. The sealing hole 10 in the sealing housing 2 is designed to have a greater diameter than the bearing hole 9 in the bearing housing 3. The mixing shaft 7 passes through the sealing hole 10 with its drive section 7.3, which extends from the housing 1 with a free end. A sealing means in the form of a packing gland 11 is disposed on the circumference of the drive section 7.3 of the mixing shaft 7, within the sealing housing 2. A support ring 12 is associated with the packing gland 11 at the end facing the bearing housing 3, which rests against the bearing housing 3. At the opposite end, a pressure spring 25 acts on the packing gland 11, which is attached to the sealing housing 2 by means of a screw adapter 26. The screw adapter 26 is threaded into an inner threading 31 formed in the sealing housing 2 on the end of the sealing hole 10. The pressure spring 25 is clamped between an incremental diameter on the screw adapter 26 and the packing gland 11. The packing gland 11 is retained on the supporting ring 12 through tension by means of the pressure spring 25.

The screw adapter 26 is formed on an adapter housing 6, which extends outside of the sealing housing 2, and sheathes the drive section 7.3 of the mixing shaft 7. An axial bearing 21 is disposed in the intermediate space between the drive section 7.3 and a housing wall 32 of the adapter housing 6, fixed in place by means of numerous retaining rings 22.1 and 22.2 on the circumference of the mixing shaft 7 and the housing wall 32. The drive section 7.3 of the mixing shaft 7 preferably includes, for this purpose, a diameter step for enabling an axial fixing of the mixing shaft within the housing 1.

In the embodiment of the dynamic mixer depicted in FIG. 1, when in operation, the free end of the drive section 7.3 of the mixing shaft 7 is connected to a drive such that the mixing shaft 7 can be driven at a predetermined rotational rate within the housing 1. When in operation, two different flowable media are supplied to the mixer via the inlets 13.1 and 13.2, which are fed via the inlet channels 15.1 and 15.2 into the mixing chamber. Within the mixing chamber, which is designed in a cylindrical shape, a mixing of the two media is generated by means of rotating the mixing shaft 7.

As a result, an intensive redistribution of the outer and inner layers is achieved by means of the groove system 18. The mixture of the two media is discharged at the end of the mixing chamber 8.

The mixing shaft 7 is directly supported in a sliding bearing when in operation by means of the bearing section 7.2 in the bearing hole 9 of the bearing housing 3. In order to prevent this from running dry, the medium flowing into the inlet 13.1 is constantly supplied with a partial flow from the bearing hole via the lubrication channel 24. For this, it is ensured, by means of the adjacent sealing hole 10 on the sealing housing 2 as well as the sealing means 11 and 12 contained therein, that the partial flow can exclusively penetrate the bearing gap in the bearing hole 9. A lubricating flow is formed within the bearing gap formed between the mixing shaft 7 and the bearing hole 9, which is directed toward the mixing chamber 8. In this manner, the mixer itself can again be used directly following a change in media. Already after a short period, the residue still remaining in the bearing gap can be rinsed out. There are no dead spaces located in the transitional region between the bearing housing and the sealing housing in which undesired residual quantities of old media can collect. Thus the dynamic mixer in accordance with the embodiment according to FIG. 1 is particularly suited for mixing a system of liquid dyes, which are frequently subjected to change.

Figure 2:
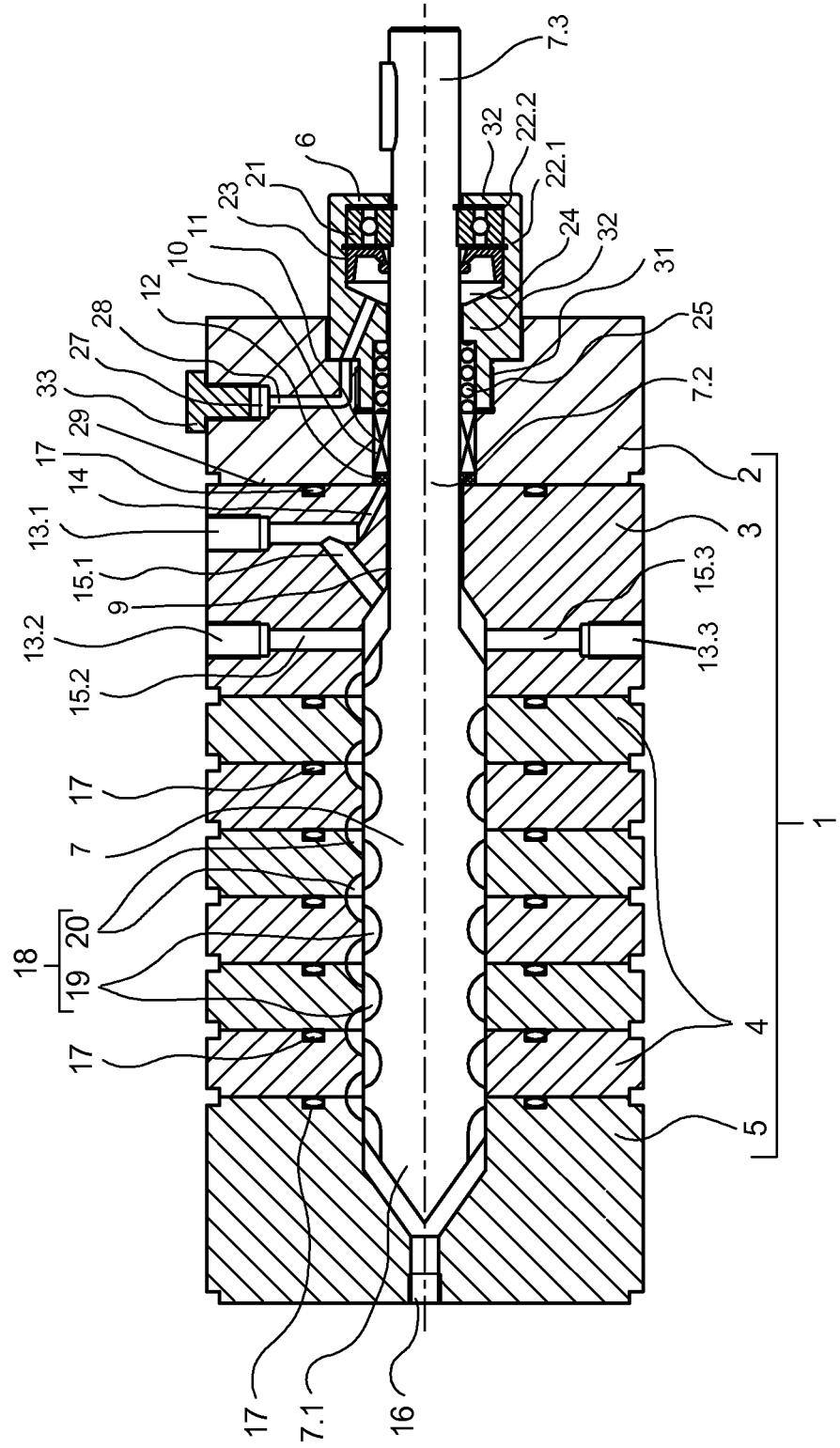
FIG. 2 shows schematically, a cross-section view of another embodiment of the mixer according to the invention.

Another embodiment of the dynamic mixer according to the invention is schematically depicted in FIG. 2, in a cross-section view. This embodiment is substantially identical to the aforementioned embodiment according to FIG. 1, such that at this point only the differences shall be explained, and otherwise, reference is made to the previous description.

The substantially cylindrically designed housing 1 is formed in this embodiment from multiple components, comprising a sealing housing 2, a bearing housing 3, numerous housing rings 4 and an outlet housing 5. The mixing chamber formed in the interior of the housing components 2, 3, 4, and 5, and the mixing shaft 7 retained therein, are designed such that they are identical to the aforementioned embodiment.

With the embodiment depicted in FIG. 2, the mixing chamber 8 has a total of three inlet channels 15.1-15.3 at the inlet end, which are connected to three inlets 13.1-13.3 formed on the circumference of the bearing housing 3. For this, a lubrication channel 14 opens into the inlet channel 15.1, which connects the bearing hole 9 to the inlet 13.1.

The mixing shaft 7 is likewise designed to be identical to the aforementioned embodiment, and is supported by means of the bearing section 7.2 in the bearing housing 3, and sealed against the external environment together with the drive section 7.3 in the sealing housing 2.

In order to obtain a complete seal on the mixing shaft extending outward, a shaft seal 23 is associated with the axial bearing 21 on the inner surface within the adapter housing 6 in the embodiment depicted in FIG. 2. Between the shaft seal 23 and the sealing means resting against the bearing housing 3, an annular chamber 24 is formed between the mixing shaft 7 and the adapter housing 6. The annular chamber 24 is coupled, by means of numerous filling channels 28, to a filling inlet 27 formed on the circumference of the sealing housing 2. The filling inlet 27 is sealed by means of a plug 33. A sealing medium is first supplied via the filler inlet 27 into the annular channel 24. The sealing liquid thereby fills the entire free space between the packing gland 11 and the shaft seal 23. In this respect, a high degree of sealing can be generated on the mixing shaft 7. A solvent is preferably used as the sealing medium, which dissolves possible leakages of the medium being treated in the mixer.

The operation of the embodiment depicted in FIG. 2 is identical to the operation of the embodiment according to FIG. 1, such that there shall be no further explanation thereof at this point.

Figure 3:
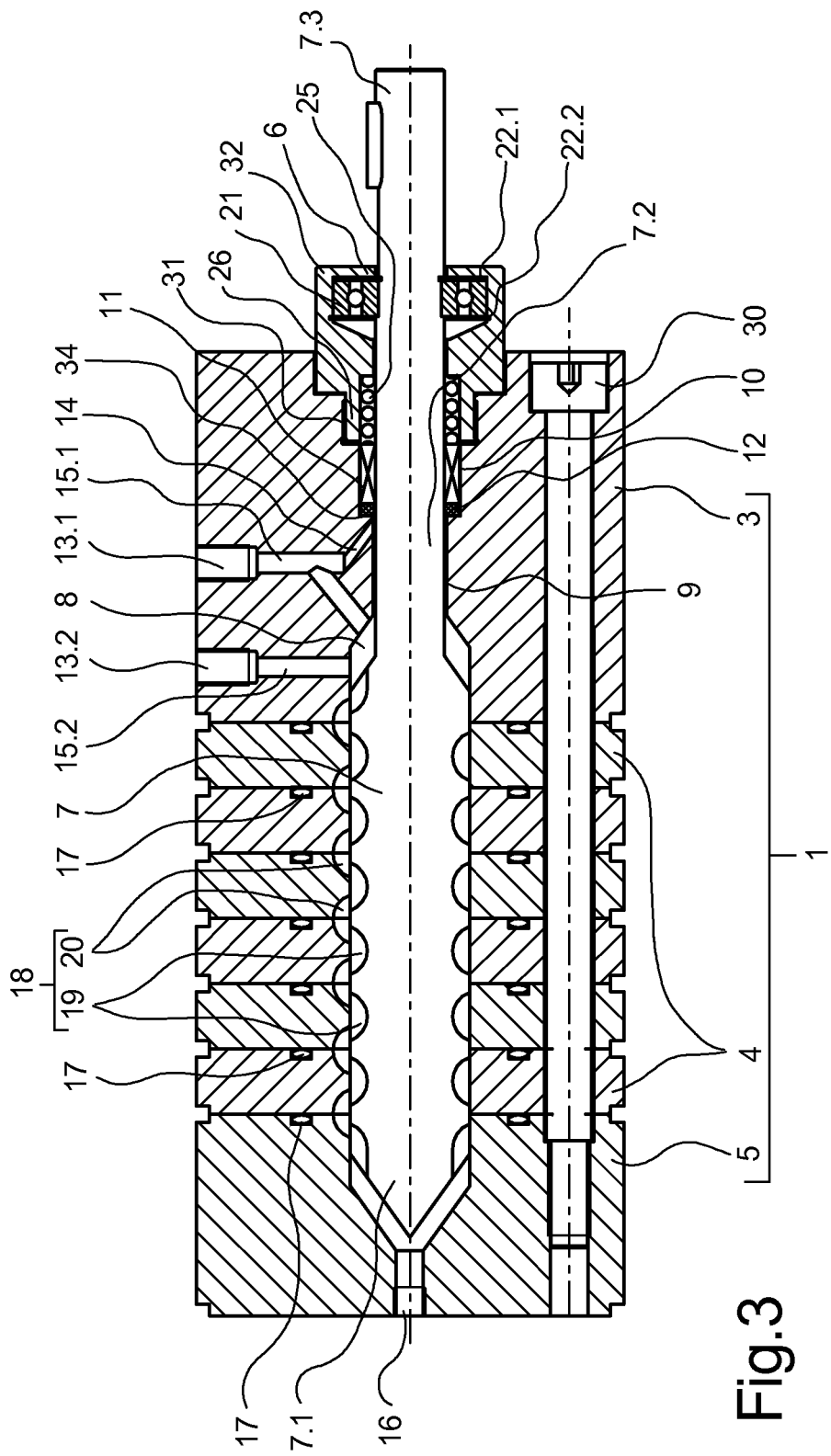
FIG. 3 shows schematically, a cross-section view of another embodiment of the mixer according to the invention.

Another embodiment of the dynamic mixer for the mixing of flowable media is schematically depicted in FIG. 3 in a cross-section view. The embodiment is identical in its function and its construction to the embodiment according to FIG. 1, and differs only in the design of the cylindrical housing 1. In this respect, only the differences to the aforementioned embodiment shall be explained in the following, and otherwise, reference is made to the previous description.

With the embodiment depicted in FIG. 3, the cylindrical housing 1 is comprised of a bearing housing 3, numerous housing rings 4 and an outlet housing 4. The housing parts 3, 4, and 5 are connected in a pressure-sealed manner by means of numerous screws 30. For this, numerous sealing rings 17 are disposed between the housing parts 3, 4, and 5.

In order to accommodate a mixing shaft 7, the bearing housing 3 includes a bearing hole 9, designed to be concentric to a mixing chamber 8. The bearing hole 9 opens into a sealing hole 10, which is designed to be concentric to the bearing hole 9, and includes a greater outer diameter with respect to the bearing hole 9. A step 34 is thus formed in the bearing housing 3 between the bearing hole 9 and the sealing hole 10.

The sealing hole 10 extends to an inner threading 31, in which a screw adapter 26 is retained on the bearing housing 3.

In the embodiment depicted in FIG. 3, the sealing means is likewise formed within the sealing hole 9 by means of a packing gland 11, which is retained against a support ring 12 by means of a pressure spring. The support ring 12 is disposed at the end of the sealing hole 10, and rests against the step 34 with respect to the bearing hole 9. The pressure spring 25 associated with the packing gland 11 is likewise retained thereby by means of the screw adapter 26 on the circumference of the mixing shaft 7 and in the bearing housing 3. On the outside of the bearing housing 3, the screw adapter 26 supports an axial bearing 21, designed as a roller bearing, on the circumference of the mixing shaft 7, by means of which the mixing shaft 7 is retained in a fixed manner within the housing 1 and, in particular, within the mixing chamber 8.

The displacement of the axial bearing to outside of the bearing housing 3 thus improves the optimization of the inner dead spaces on the circumference of the mixing shaft in the region of the sliding bearing.

In the embodiments depicted in FIGS. 1-3, a packing gland is used as the sealing means, which, when in the spring tensioned state ensures a high degree of sealing and long periods of stability. Alternatively, there is also the possibility of using other sealing means such as, for example, shaft seals.

The dynamic mixer according to the invention is thus distinguished by very limited dead spaces within the housing, in which a flowable medium can collect when in operation. Thus, the dynamic mixer is particularly suited for use in which different media can be mixed in a flexible manner when in operation. Thus, it is possible, for example, to undertake a color change in the mixing of dyes, and to implement a rinsing of the mixer in very short operating time periods.

| List of Reference Symbols | |
|---|---|
| 1 | housing |
| 2 | sealing housing |
| 3 | bearing housing |
| 4 | housing rings |
| 5 | outlet housing |
| 6 | adapter housing |
| 7 | mixing shaft |
| 7.1 | mixing section |
| 7.2 | bearing section |
| 7.3 | drive section |
| 8 | mixing chamber |
| 9 | bearing hole |
| 10 | sealing hole |
| 11 | packing gland |
| 12 | support ring |
| 13.1, 13.2, 13.3 | inlet |
| 14 | lubricant channel |
| 15.1, 15.2 | inlet channel |
| 16 | outlet |
| 17 | sealing ring |
| 18 | groove system |
| 19 | mixing grooves |
| 20 | housing grooves |
| 21 | axial bearing |
| 22.1, 22.2 | retaining ring |
| 23 | shaft seal |
| 24 | ring chamber |
| 25 | pressure spring |
| 26 | screw adapter |
| 27 | filling inlet |
| 28 | filling channel |
| 29 | interstice |
| 30 | screw |
| 31 | inner threading |
| 32 | housing wall |
| 33 | plug |
| 34 | step |

The invention claimed is:

1. A dynamic mixer for mixing flowable media comprising:
   a. a mixing chamber in a multipart housing, having a plurality of inlets and an outlet both of which are connected to the mixing chamber;
   b. a mixing shaft that extends with a mixing section into the mixing chamber and is supported in a sliding bearing in the housing with a bearing section, the mixing shaft having a portion extending outward from the housing with a drive section for coupling to a drive,
   c. a sealing hole provided in the housing and associated with the drive section of the mixing shaft;
   d. a bearing hole for supporting the bearing section of the mixing shaft; and,
   e. a lubrication channel in fluid communication with the bearing hole and at least one of the inlets,
   wherein the sealing hole is configured such that it has a diameter greater than a diameter of the bearing hole, for accommodating a sealing means.

2. The dynamic mixer according to claim 1, further comprising an interstice in the housing that is disposed between the sealing hole and the bearing hole.

3. The dynamic mixer according to claim 2, wherein the bearing hole is formed in a bearing housing and the sealing hole is formed in a sealing housing such that the bearing housing and the sealing housing are connected to one another in a pressure-sealed manner via the interstice.

4. The dynamic mixer according to claim 1, further comprising a support ring on the circumference of the mixing shaft and associated with the sealing means so that the sealing means is supported with respect to the bearing hole.

5. The dynamic mixer according to claim 4, further comprising a sealing means that includes a packing gland and a pressure spring associated with the packing gland such that the packing gland is retained on the support ring by the pressure spring.

6. The dynamic mixer according to claim 3, further comprising an axial bearing associated with the drive section of the mixing shaft outside of the sealing hole, wherein the axial bearing is retained by an adapter housing connected to the sealing housing.

7. The dynamic mixer according to claim 6, further comprising a shaft seal ring and a ring chamber disposed on the circumference of the drive section of the mixing shaft between the axial bearing and the sealing means, wherein the ring chamber can be filled with a sealing medium.

8. The dynamic mixer according to claim 1, wherein the mixing chamber is formed by a plurality of housing rings, which are retained in a pressure-sealed manner in the housing, and which form a groove system within the mixing chamber in conjunction with the mixing section of the mixing shaft.

9. The dynamic mixer according to claim 8, wherein the housing rings are disposed between an outlet housing and a bearing housing and wherein the mixing chamber extends from the bearing housing to the outlet housing.

10. The dynamic mixer according to claim 9, wherein the outlet is formed on the outlet housing and the inlets are formed on the bearing housing.

* * * * *